US008092034B2

(12) United States Patent
Zarian et al.

(10) Patent No.: US 8,092,034 B2
(45) Date of Patent: Jan. 10, 2012

(54) ILLUMINATED TILE SYSTEMS AND METHODS FOR MANUFACTURING THE SAME

(75) Inventors: James R. Zarian, Corona del Mar, CA (US); Richard d. Ashoff, Newport Beach, CA (US)

(73) Assignee: Richard David Ashoff, Newport Beach, CA (US)

( * ) Notice: Subject to any disclaimer, the term of this patent is extended or adjusted under 35 U.S.C. 154(b) by 37 days.

(21) Appl. No.: 12/266,423

(22) Filed: Nov. 6, 2008

(65) Prior Publication Data
US 2009/0116241 A1    May 7, 2009

Related U.S. Application Data

(60) Provisional application No. 60/996,221, filed on Nov. 7, 2007.

(51) Int. Cl.
*F21S 8/00* (2006.01)
(52) U.S. Cl. .... 362/145; 362/147; 362/240; 362/249.06
(58) Field of Classification Search .................. 362/145, 362/147, 240, 249.06, 101, 153, 153.1
See application file for complete search history.

(56) References Cited

U.S. PATENT DOCUMENTS

| | | | |
|---|---|---|---|
| 2,135,118 A * | 11/1938 | Stewart | 52/396.1 |
| 4,932,182 A * | 6/1990 | Thomasson | 52/318 |
| 5,375,043 A | 12/1994 | Tokunaga | |
| 5,598,382 A | 1/1997 | Wilson et al. | |
| 5,775,791 A | 7/1998 | Yoshikawa et al. | |
| 6,027,280 A * | 2/2000 | Conners et al. | 404/19 |
| 6,539,656 B2 | 4/2003 | Maas et al. | |
| 6,787,990 B2 | 9/2004 | Cok | |
| 6,827,456 B2 | 12/2004 | Parker et al. | |
| 6,840,646 B2 | 1/2005 | Cornelissen et al. | |
| 7,063,449 B2 | 6/2006 | Ward | |
| 7,077,544 B2 | 7/2006 | Parker | |
| 7,090,389 B2 | 8/2006 | Parker et al. | |
| 7,108,392 B2 | 9/2006 | Strip et al. | |
| 7,108,414 B2 | 9/2006 | McCollum et al. | |

(Continued)

OTHER PUBLICATIONS

PCT International Search Report dated Dec. 23, 2008, in connection with corresponding PCT application No. PCT/US08/82675.

*Primary Examiner* — Jason Moon Han
*Assistant Examiner* — Danielle Allen
(74) *Attorney, Agent, or Firm* — Mintz, Levin, Cohn, Ferris, Glovsky and Popeo, P.C.

(57) ABSTRACT

In one embodiment, a lighted tile system, comprises a first tile. The first tile comprises a tray that comprises a floor, one or more walls coupled to a perimeter of the floor, and a cavity defined at least in part by the floor and the one or more walls. The first tile also comprises a ceiling coupled to the tray and located substantially opposite the floor of the tray, and a substrate located between the floor of the tray and the ceiling. One or more light sources are coupled to the substrate to shine a light from the one or more light sources in a substantially uniform pattern towards the ceiling. The ceiling is at least partially translucent to permit at least part of the light from the one or more light sources to shine through the ceiling. Other embodiments and related methods are also disclosed herein.

50 Claims, 10 Drawing Sheets

U.S. PATENT DOCUMENTS

| | | |
|---|---|---|
| 7,322,730 B2 | 1/2008 | Parker |
| 7,344,334 B2 * | 3/2008 | Thorkelson .................. 404/29 |
| 7,358,929 B2 | 4/2008 | Mueller et al. |
| 7,374,327 B2 | 5/2008 | Schexnaider |
| 7,549,784 B1 * | 6/2009 | Teeters ..................... 362/576 |
| 2004/0022058 A1 * | 2/2004 | Birrell ...................... 362/249 |
| 2004/0184263 A1 * | 9/2004 | Patti .......................... 362/145 |
| 2005/0023972 A1 | 2/2005 | Lewandowski et al. |
| 2005/0116667 A1 | 6/2005 | Mueller et al. |
| 2006/0001036 A1 | 1/2006 | Jacob et al. |
| 2006/0231131 A1 * | 10/2006 | Hain ......................... 136/244 |
| 2006/0291197 A1 | 12/2006 | Patti |
| 2007/0103922 A1 | 5/2007 | Rissmiller et al. |
| 2007/0133193 A1 * | 6/2007 | Kim .......................... 362/147 |
| 2007/0193088 A1 | 8/2007 | Lemberger et al. |
| 2007/0258231 A1 | 11/2007 | Koerner et al. |
| 2008/0019121 A1 | 1/2008 | Ly |
| 2008/0020507 A1 | 1/2008 | Nomura |
| 2008/0037284 A1 * | 2/2008 | Rudisill ..................... 362/629 |
| 2008/0085390 A1 | 4/2008 | Neill et al. |
| 2008/0205080 A1 | 8/2008 | Erchak et al. |

* cited by examiner

ILLUMINATED TILE SYSTEMS AND METHODS FOR MANUFACTURING THE SAME

CLAIM OF PRIORITY

This application is a non-provisional patent application claiming priority to U.S. Provisional Patent Application No. 60/996,221, filed on Nov. 7, 2007, which is incorporated by reference.

TECHNICAL FIELD

This disclosure relates generally to tiles, and relates more particularly to illuminated tiles and methods for manufacturing the same.

BACKGROUND

The use of internal lighting in tiles and/or pavers that can be combined or arranged into illuminated tile systems has been constrained by technological limitations. For example, older systems had to rely on light sources of limited lifetime, making it impractical for lighted tiles to be permanently installed into buildings and/or walkways. Newer technologies, including solid state lighting systems like light emitting diodes and organic light emitting diodes, present new opportunities to integrate internal lighting into tiles in practical and durable ways. The added durability can permit the use of illuminated tile systems for safety and/or decorative purposes.

Several issues remain unresolved, however, by the new technologies. As an example, hot spots and dead zones of lights within tiles, and dark junctions between tiles, still compromise the effectiveness of illuminated tile systems. Weatherproofing of the internal lighting of the tiles from water and/or dirt also remains impractical and expensive.

Figure 1:
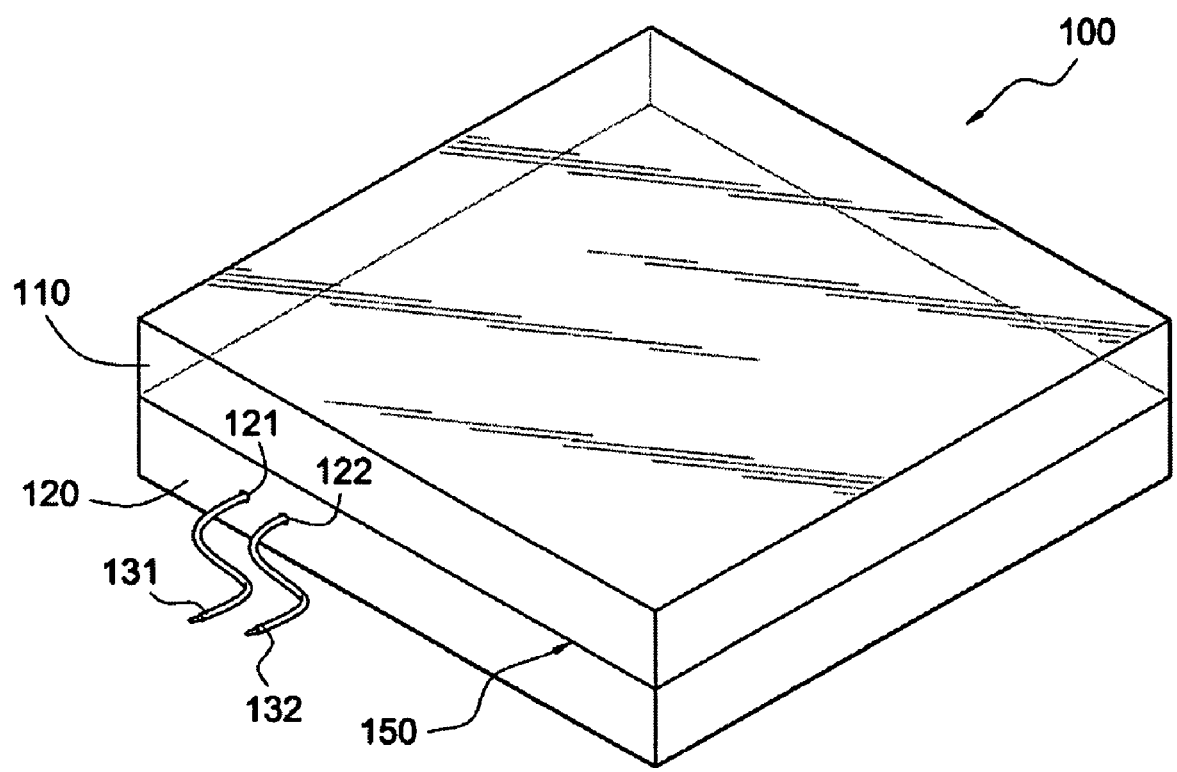
FIG. 1 illustrates a perspective view of a first tile of a first lighted tile system.

For simplicity and clarity of illustration, the drawing figures illustrate the general manner of construction, and descriptions and details of well-known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the illuminated tile systems and methods for manufacturing the same described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the illuminated tile systems and methods for manufacturing the same described herein are, for example, capable of operation in other orientations than those illustrated or otherwise described herein. The term "coupled," as used herein, is defined as directly or indirectly connected in an electrical, physical, mechanical, optical, or other manner. The term "on," as used herein, is defined as on, at, or otherwise adjacent to or next to or over.

The terms "couple," "coupled," "couples," "coupling," and the like should be broadly understood and refer to connecting two or more elements, mechanically, electrically, optically, and/or otherwise, either directly or indirectly through intervening elements. Coupling may be for any length of time, e.g., permanent or semi-permanent or only for an instant. The absence of the word "removably," "removable," and the like near the word "coupled," and the like does not mean that the coupling, etc. in question is or is not removable.

The term "translucent" describes a material that is translucent and/or transparent.

DESCRIPTION

In one embodiment, a lighted tile system, comprises a first tile. The first tile comprises a tray that comprises a floor, one or more walls coupled to a perimeter of the floor, and a cavity defined at least in part by the floor and the one or more walls. The first tile also comprises a ceiling coupled to the tray and located substantially opposite the floor of the tray, and a substrate located between the floor of the tray and the ceiling.

One or more light sources are coupled to the substrate to shine a light from the one or more light sources in a substantially uniform pattern towards the ceiling. The ceiling is at least partially translucent to permit at least part of the light from the one or more light sources to shine through the ceiling.

Figure 2:
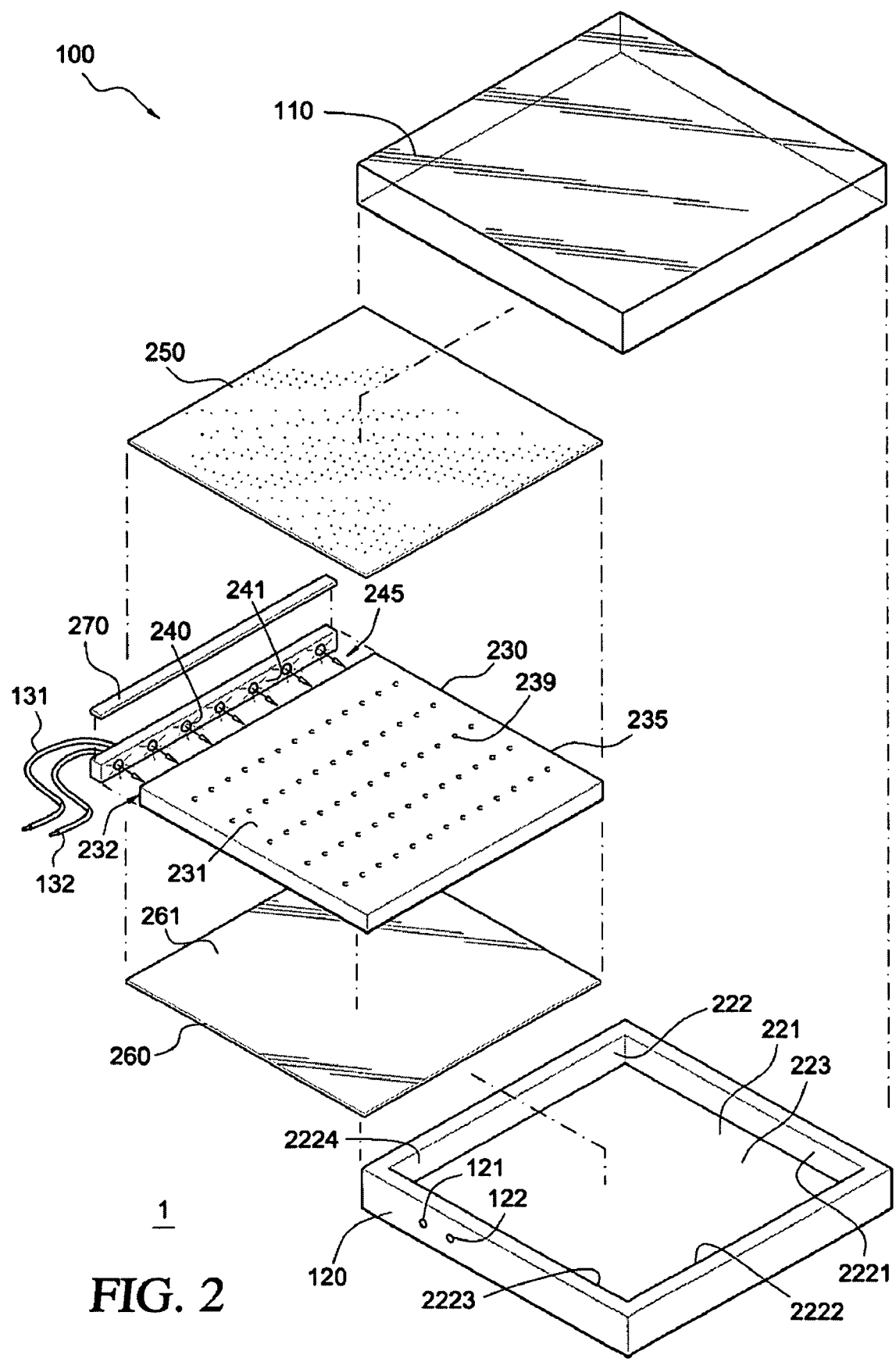
FIG. 2 illustrates a perspective exploded view of the first tile of FIG. 1.

Referring now to the figures, FIG. 1 illustrates a perspective view of tile 100 of lighted tile system 1. FIG. 2 illustrates a perspective exploded view of tile 100. Tile 100 comprises tray 120 and ceiling 110 coupled together at junction 150 (FIG. 1).

As described in further detail below, tile 100 comprises internal lighting that emits light visible through ceiling 110, where ceiling 110 is at least partially translucent. As a result, tile 100 can be visible even in dark conditions when turned on or otherwise energized. In the present example, ceiling 110 comprises a polymethyl methacrylate material such as HFI10100 from Atofina Chemicals, Inc. of Philadelphia, Pa., USA. Another example of ceiling 110 could use a polymethyl methacrylate material such as DF100, also from Atofina Chemicals, Inc. Although normally transparent, the polymethyl methacrylate material could also be pigmented if desired. In other examples, ceiling 110 can comprise a different plastic material, such as a polyester, polyamide, polycarbonate, high impact polystyrene, polyvinyl chloride (PVC), and/or acrylonitrile butadiene styrene (ABS) material, among others. Still other embodiments of ceiling 110 can comprise a glass material that is at least partially translucent, and/or a translucent stone material such as marble, onyx, granite, and/or quartz, among others. Some embodiments and can comprise a variety of colors for the internal lighting and/or for ceiling 110.

Lighted tile system 1 can comprise other tiles that can be similar and/or identical to tile 100, such that the tiles of lighted tile system 1 can be arranged relative to each other in multiple configurations for a variety of applications. One application of lighted tile system 1 can be for decorative purposes. For example, the tiles of lighted tile system 1 can be arranged relative to each other as an illuminated matrix forming a work of art. In some examples, the tiles of lighted tile system 1 can comprise different colors of light. In the same or a different example, individual ones of the tiles of lighted tile system 1 may be configured to statically illuminate with one or more colors of light, and/or to dynamically alternate one or more colors of light. In the same or a different example, lighted tile system 1 may comprise a controller mechanism, such as a computer, to control the tiles of lighted tile system 1 through different layout or timing patterns, where the different layout or timing patterns could be responsive to user input, environmental conditions, lights, sounds, and/or music in some embodiments.

Another application of lighted tile system 1 can be for safety purposes. In some examples, lighted tile system 1 can be used to provide adequate illumination for different environments, such as in or around rooms, hallways, walkways, stairs, and/or swimming pools. Such illumination could reduce the risk of accidents by making hazardous objects visible and/or by leading people to entrances or exits. In some examples, lighted tile system 1 can have both decorative and safety purposes. For example, lighted tile system 1 can be used as a wainscot around a room, or laid at the center or perimeter of the floor of a room or hallway, to provide a decorative effect while illuminating the environment for safety.

As seen in FIG. 2, tray 120 of tile 100 comprises floor 221 and one or more walls 222 coupled to a perimeter of floor 221. In the illustrated embodiment, walls 222 are located around the entire perimeter of floor 221, but other configurations are possible. Although in the present embodiment floor 221 and walls 222 are shown as formed out of the same piece of material, there could be other embodiments where floor 221 and walls 222 are formed out of different pieces of material and then coupled together to form tray 120. In either case, the combination of floor 221 and the one or more walls 222 defines cavity 223 within tray 120. In the present example, the perimeter of floor 221 is rectangular, but other configurations are possible. Similarly, in the present example, walls 222 comprises walls 2221-2224, but other configurations are possible. For example, in a different embodiment, one or more walls 222 could comprise a single wall forming a circular or oval closed perimeter around a circular or oval floor. Tray 120 can comprise a polymethyl methacrylate material, as described above for ceiling 110. In a different example, tray 120 can comprise a metallic material, or any of the materials described above for ceiling 110.

Tile 100 also comprises substrate 230 located between floor 221 of tray 120 and ceiling 110. Substrate 230 can comprise dimensions corresponding to dimensions of cavity 223 of tray 120, such that substrate 230 can be located within tray 120. In a different embodiment, substrate 230 may form part of, or be integral with, floor 221 of tray 120 or ceiling 110. Tile 100 also comprises one or more light sources 240 coupled to substrate 230. Light sources 240 comprise light emitting diodes (LED) in the present embodiment, but could comprise other devices such as organic light emitting diodes (OLEDs) and/or light emitting capacitors (LECs) in other embodiments.

Ceiling 110 can be coupled to walls 222 of tray 120 and can be located substantially opposite floor 221 to seal substrate 230 and light sources 240 within cavity 223 via a junction such as junction 150 (FIG. 1), where the junction can comprise a silicone junction, an adhesive junction, a sonic weld junction, and/or a grout junction. In some examples, a grout junction could comprise a material such as cement, ceramic, plaster, and/or caulk. In the same of a different embodiment, an adhesive junction could comprise an epoxy material and/or other polymeric materials. The junction can be weatherproof and/or waterproof to restrict water and/or dirt from entering cavity 230 of tray 120 and to thereby protect substrate 230 and light sources 240 from the elements. In some examples, a similar junction may be made between floor 221 and walls 222 of tray 120.

In the present example, substrate 230 comprises light guide 235, and light sources 240 are distributed across carrier 241. Carrier 241 is configured to fit between wall 2224 of tray 120 and edge 232 of substrate 230 when carrier 241 and substrate 230 are located in cavity 223 of tray 120. Leads 131-132 are also coupled to light sources 240, and are configured to provide a path for power to reach light sources 240. When carrier 241 is located in tray 120, leads 131-132 can be routed through conduits 121-122 to be accessible at an exterior of tile 100. Although in the present example conduits 121-122 are shown coupled through wall 2223 of tray 120, there could be other embodiments where conduits 121-122 are routed to the exterior of tile 100 through other locations. In the present example, when carrier 241 is between wall 2224 and substrate 230, light sources 240 are located substantially parallel to edge 232 of substrate 230. As a result, light sources 240 can shine light 245 from one or more light sources 240 through edge 232 into substrate 230. There can be other embodiments where light sources 240 are integral with and/or formed as part of substrate 230, as described in more detail below, thereby eliminating the need for carrier 241. Other details of tile 100 that are illustrated in FIG. 2 are described below.

Figure 3:
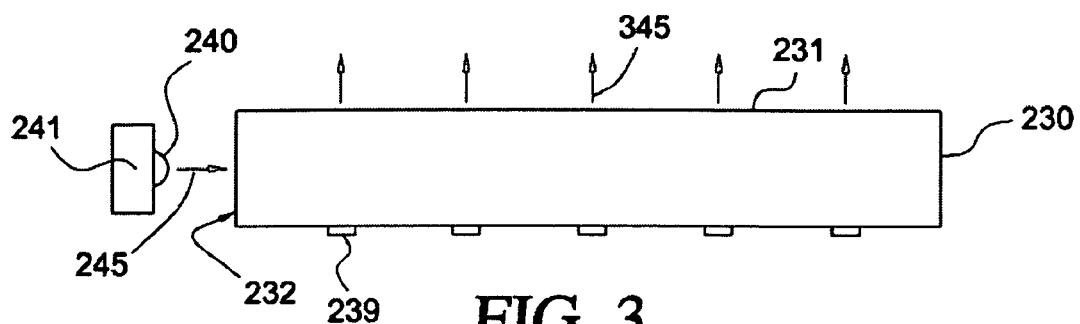
FIG. 3 illustrates a side view of a substrate coupled with light sources of the first tile of FIG. 1.
Figure 4:
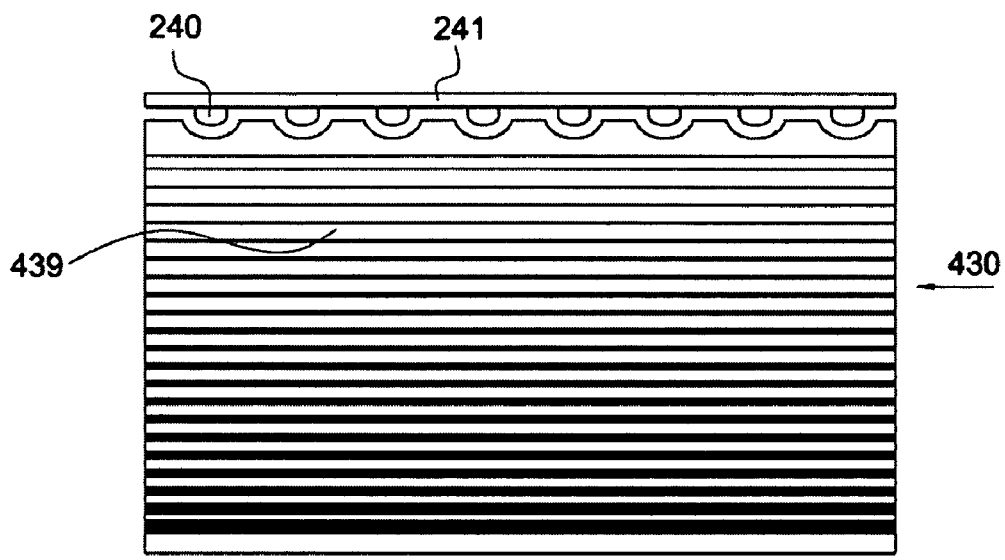
FIG. 4 illustrates a top view of light sources coupled to a substrate comprising v-cut light guide features.
Figure 5:
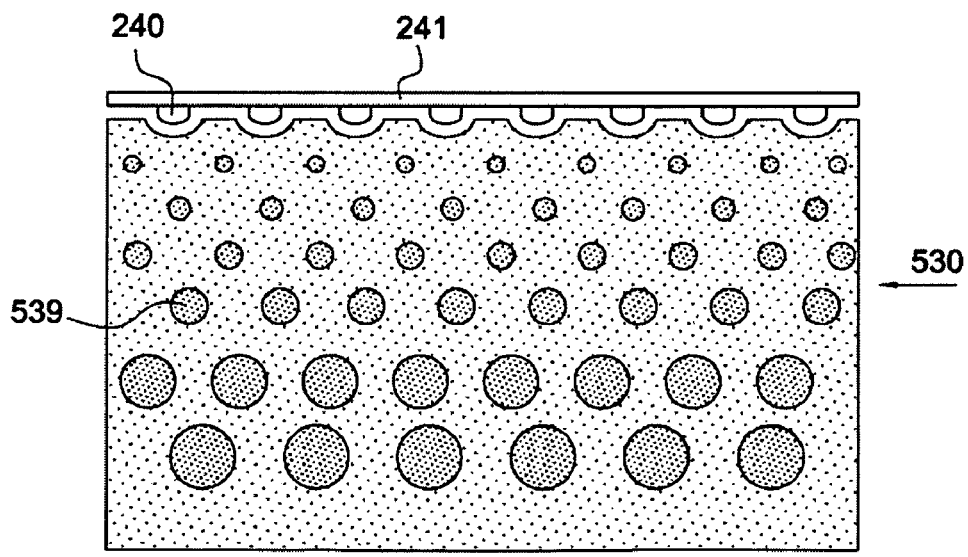
FIG. 5 illustrates a top view of light sources coupled to a substrate comprising dot-printed light guide features.
Figure 6:
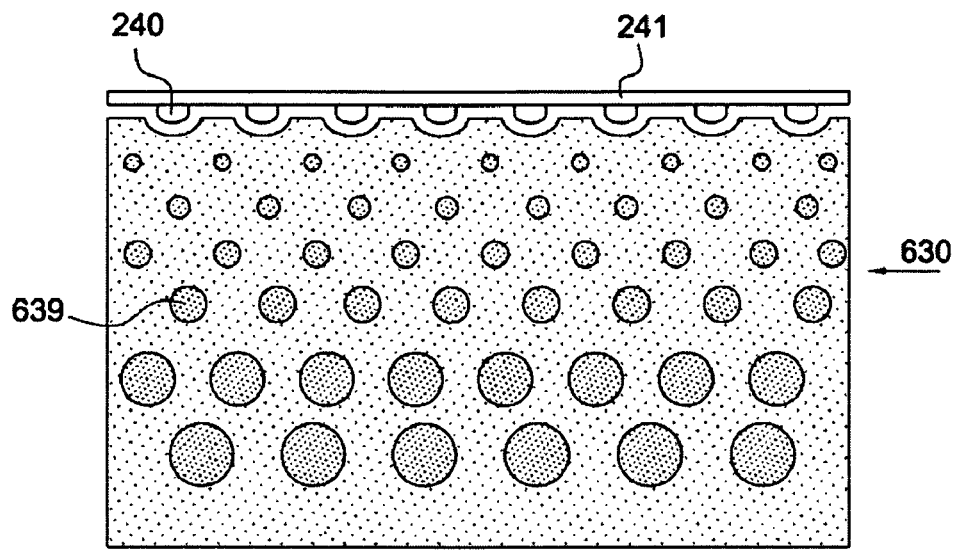
FIG. 6 illustrates a top view of light sources coupled to a substrate comprising dot-etched light guide features.
Figure 7:
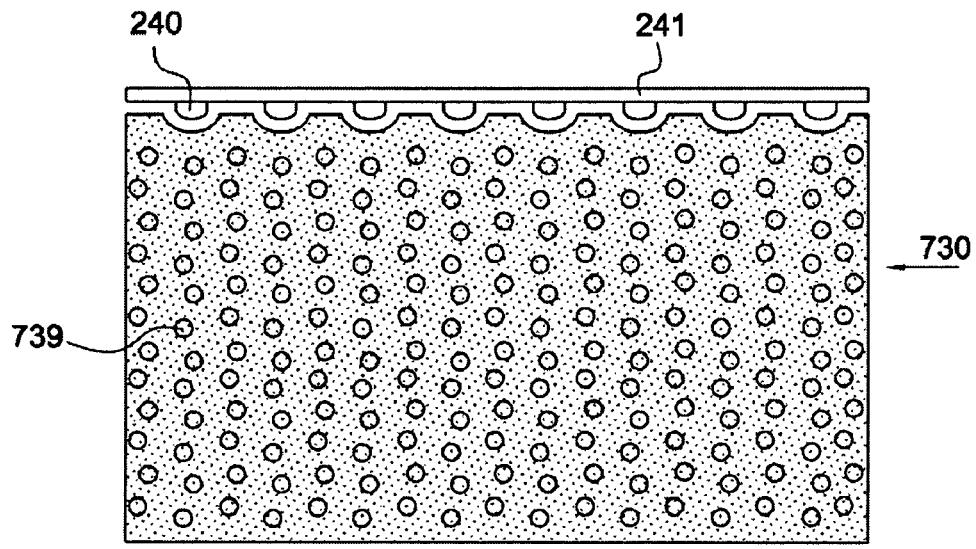
FIG. 7 illustrates a top view of light sources coupled to a substrate comprising microlens, microprism, and/or microstructure light guide features.

FIG. 3 illustrates a side view of substrate 230 coupled to one or more light sources 240 of tile 100. Substrate 230 comprises features 239 configured to direct at least portion 345 of light 245 towards and/or through side 231 of substrate 230. In the present example, features 239 are substantially evenly distributed across substrate 230, and can also shine portion 345 of light 245 in a substantially uniform pattern towards ceiling 110. In other embodiments, substrate 230 can comprise features different from features 239 to direct light towards ceiling 110 (FIGS. 1 and 2) in a substantially uniform pattern. As an example, FIG. 4 illustrates a top view of substrate 430 comprising v-cut light guide features 439, and FIG. 5 illustrates a top view of substrate 530 comprising dot-printed light guide features 539. As further examples, FIG. 6 illustrates a top view of substrate 630 comprising dot-etched light guide features 639, and FIG. 7 illustrates a top view of substrate 730 comprising microlens, microprism, and/or microstructure light guide features 739.

In some examples, the features of substrate 230 of tile 100, such as features 239 (FIGS. 2 and 3), 439 (FIG. 4), 539 (FIG. 5), 639 (FIG. 6), and/or 739 (FIG. 7), can be capable of shining a portion of light 245 in a substantially uniform pattern towards ceiling 110 (FIGS. 1 and 2) even if the features themselves are not substantially evenly distributed across their respective substrates or differ in size and/or concentration. In any event, because ceiling 110 is partially translucent, it can permit at least portion 345 of light 245 to shine through ceiling 110 (FIGS. 1 and 2) and to be visible from an exterior of tile 100.

Returning to FIG. 2, tile 100 further comprises diffusive layer 250 located between side 231 of substrate 230 and ceiling 110. In the present example, diffusive layer 250 is configured to diffuse light directed towards ceiling 110. For example, diffusive layer 250 can be translucent, partially transparent, and/or frosted to diffuse portion 345 of light 245 evenly across ceiling 110. In a different example, diffusive layer 250 can comprise a design, pattern, and/or logo configured to at least partially block or be illuminated by portion 345 of light 245 such as to be visible through ceiling 110. Other embodiments may eliminate the use of diffusive layer 250, particularly when substrate 230 serves the same or similar function as diffusive layer 250.

Tile 100 also comprises reflective layer 260 in the present embodiment, where reflective layer 260 comprises reflective sheet 261 located between substrate 230 and floor 221 of tray 120. Reflective layer 260 can be configured to reflect at least a portion of light 245 that shines through side 232 of substrate 230 back towards ceiling 110. In a different embodiment, reflective layer 260 can be eliminated, particularly where floor 221 serves the same function of reflective layer 260. Other examples may also forego the use of reflective layer 260.

Continuing with the embodiment of FIG. 2, tile 100 also comprises hot spot blocking mechanism 270 positioned between ceiling 100 and at least a portion of light sources 240. Hot spot blocking mechanism 270 also can be located between diffusive layer 250 (when used) and carrier 241. Hot spot blocking mechanism 270 is opaque, and can thus be used to block or diminish the appearance of "hot spots" or concentrations of light around the one or more light sources 240 in order to aid in the uniform distribution of light 245 towards ceiling 110. In the present example, hot spot blocking mechanism comprises a strip of metallic foil, although other materials such as an opaque plastic are possible. Other examples may forego the use of hot spot blocking mechanism 270.

Figure 8:
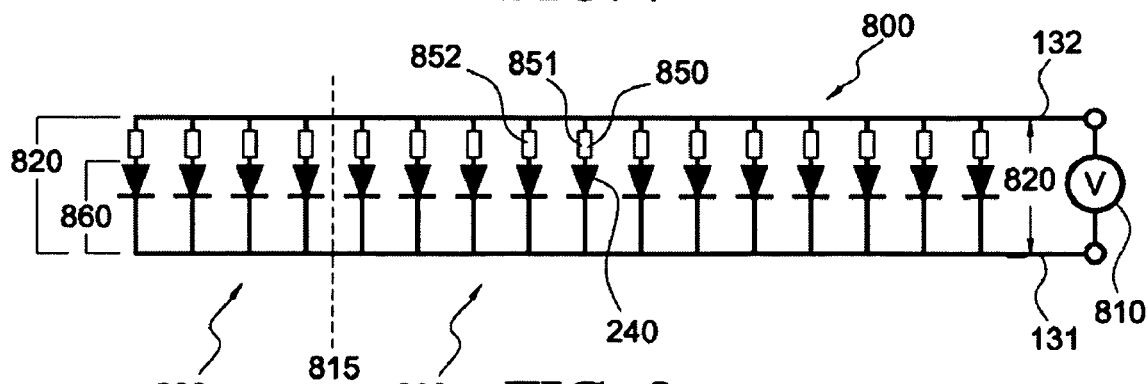
FIG. 8 illustrates an electrical schematic of circuitry for the one or more light sources of the first file of FIG. 1.

FIG. 8 illustrates an electrical schematic of circuitry 800 for one or more light sources 240 of tile 100 (FIGS. 1-2) of lighted tile system 1 (FIGS. 1-2). Circuitry 800 can comprise power supply circuit 810 to power at least a portion of one or more light sources 240. In the present example, power supply circuit 810 couples to light sources 240 through leads 131-132 to supply rated power magnitude 820 of approximately 12 Volts DC (direct current). Although light sources 240 are rated to handle at least approximately 12 Volts DC in the present embodiment, other embodiments may comprise light sources configured to handle a different rated power magnitude, such as approximately 3 Volts DC.

The present embodiment also comprises derating circuit 850 configured to deliver a derated power magnitude 860 to one or more light sources 240, where derated power magnitude 860 is less than rated power magnitude 820. In the present example, derating circuit 850 comprises resistance elements coupled between a node of lead 132 and each of light sources 240 to generate derated power magnitude 860. Each one of one or more light sources 240 is thus coupled to a different one of the one or more resistance elements of derating circuit 850 in the present example. As an example, the one or more resistance elements can comprise resistors 851-852, but other resistance elements can be used. Resistance values for the resistance elements may be tailored depending on, for example, a target lifetime for light sources 240, the output of power supply circuit 810, and/or on the type or brand of light sources 240. By providing light sources 240 with derated power magnitude 860, instead of rated power magnitude 820, the longevity of light sources 240 can be increased accordingly.

In a different embodiment, derating circuit 850 comprises a different configuration. As an example, derating circuit 850 can comprise a single resistance element, instead of a set of resistance elements. In this example, the single resistance element can be located between power supply circuit 810 and each of light sources 240, and/or between lead 132 and each of light sources 240. This example can be used when light sources 240 are located closer together to each other and/or when there are fewer light sources 240, particularly when the power source for the lighted tile system is a DC power source, and the embodiment of FIG. 8 can be used when light sources 240 are located further apart from each other and/or when there are a larger quantity of light sources 240. If the power source is an alternating current (AC) power source, however, the choice of which embodiment of derating circuit 850 to use can be based on other considerations such as, for example, cost. Other aspects of circuit 800 shown in FIG. 8 are described below.

Figure 9:
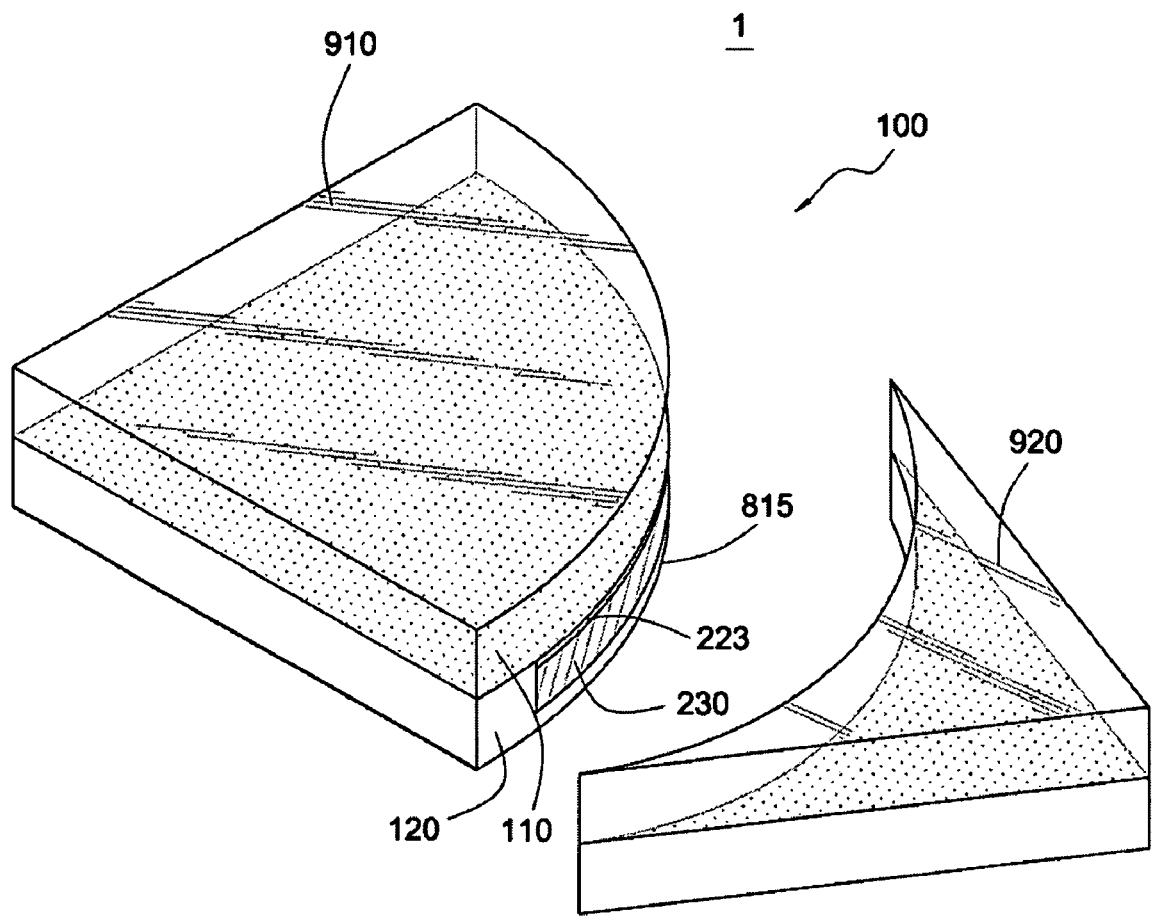
FIG. 9 illustrates a perspective view of the first tile of FIG. 1 after being cropped.

FIG. 9 illustrates a perspective view of tile 100 after being cropped. In the present embodiment, tile 100 is comprised of materials crop-able to form a custom edge, such as custom edge 815 of section 910 of tile 100. The ability to crop custom edge 815 of tile 100 can be beneficial, for example, to permit section 910 of tile 100 to be positioned within a defined perimeter. The ability to crop custom edge 815 can also permit section 910 of tile 100 to conform to a specific contour of an area over which section 910 is to be laid, without having to manufacture custom tiles having a myriad of custom sizes. The crop-able nature of tile 100 can achieve time and cost savings by not having to order and wait for custom tiles.

In the present example, section 920 of tile 100 is cropped off of tile 100 by sawing or otherwise cutting along custom edge 815. The cropping of a custom edge can, as in the present example, leave exposed the contents of cavity 223, including substrate 230 and light sources 240, such that tile 100 would no longer be weatherproof and/or waterproof to protect the contents of cavity 223. To remedy the exposure of cavity 223 after cropping tile 100, custom edge 815 can be configured to be sealable with a seal. The seal can comprise a silicone seal, a grout seal, an adhesive seal, and/or a replacement wall section, to make cavity 223 waterproof and/or weatherproof again. As an example, the replacement wall section can be comprised of a flexible rubber or of materials used for tray 120. In some examples, a grout seal could comprise a material such as cement, ceramic, plaster, and/or caulk. In the same or a different embodiment, an adhesive seal could comprise an epoxy material and/or other polymeric materials.

One benefit of the present example is that light sources 240 are configured to remain operable after the cropping of tile 100. Returning to FIG. 8, the one or more light sources 240 are interconnected such that at least portion 880 of light sources 240 coupled to section 910 of tile 100 (FIG. 9) will survive such cropping. In the present example, the parallel nature of circuitry 800 permits portion 880 of light sources 240 to remain operational even though the cropping through custom edge 815 splits portion 890 off of circuitry 800. The different embodiment of FIG. 8 where derating circuit 850 comprises a single resistor, as described above, also can be cropped in this manner.

Figure 11:
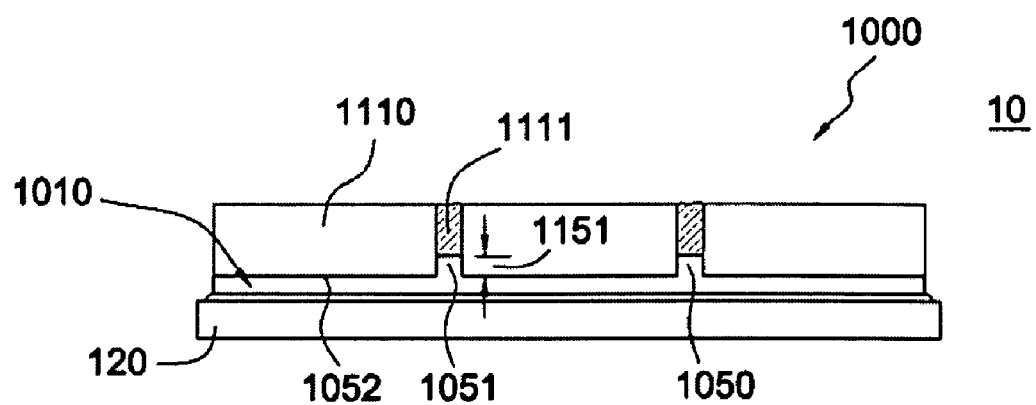
FIG. 11 illustrates a side view of the first tile of the second lighted tile system, and overlays located within the grid of the first tile.
Figure 10:
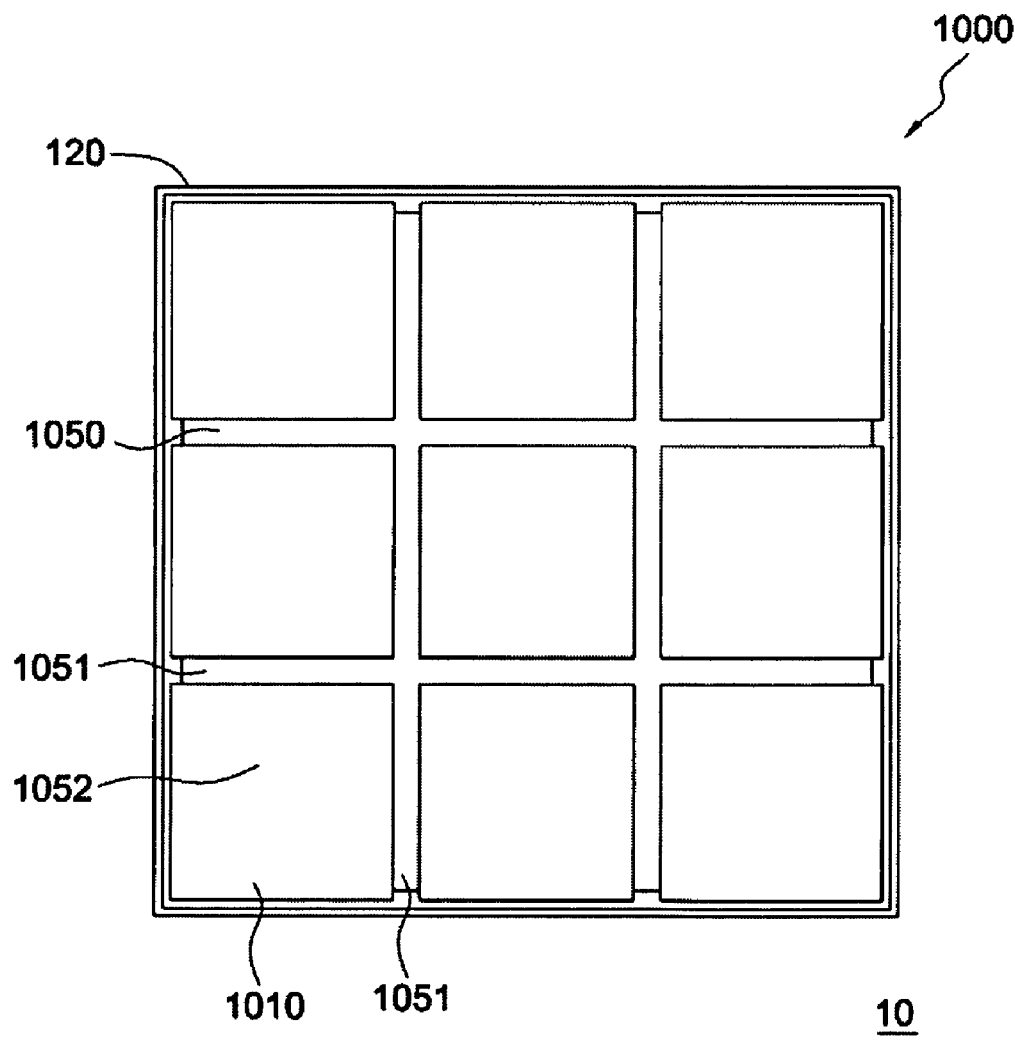
FIG. 10 illustrates a top view of a first tile of a second lighted tile system, where the first tile comprises a grid.

FIG. 10 illustrates a top view of tile 1000 of lighted tile system 10, comprising grid 1050. FIG. 11 illustrates a side view of tile 1000 of lighted tile system 10 with translucent overlays 1110 located within grid 1050. Lighted tile system 10 can be similar to lighted tile system 1 (FIGS. 1, 2, and 9), but comprises tile 1000 rather than tile 100. Tile 1000 is similar to tile 100 (FIGS. 1, 2), but comprises grid 1050 at an exterior side of ceiling 1010. Tile 1000 can also include a weatherproof and/or waterproof junction between ceiling 1010 and tray 120.

Grid 1050 comprises one or more ribs 1051 with one or more regions 1052 between one or more ribs 1051 as part of grid 1050. In some embodiments, one or more regions 1052 can be used to accommodate one or more translucent overlays 1110 between one or more ribs 1051. Overlays 1110 can comprise, for example, decorative tiles configured to permit light from one or more light sources within tile 1000 to shine through. In some examples, one or more regions 1052 can be sized to correspond with dimensions of one or more translucent overlays 1110. Although the present example illustrates one or more regions 1052 and one or more translucent overlays 1110 as substantially rectangular or square and as comprising a single size, there may be other embodiments where regions 1052 and/or translucent overlays 1110 could comprise other or diverse geometric shapes, and/or where regions 1052 and/or translucent overlays 1110 could be arranged to form decorative patterns or mosaics over tile 1000.

Grid 1500 can be configured to accommodate grout material 1111 comprising fillers, sealers, and/or adhesives above the one or more ribs 1051 and/or between one or more translucent overlays 1110. In the present example, one or more ribs 1051 comprise height 1151 over one or more regions 1052. Besides assisting in the alignment of one or more translucent tiles 1110 over one or more regions 1052, one or more ribs 1051 can be configured with height 1151 to permit the deposit of grout material 1111 between the one or more translucent overlays 1110. In the present example, height 1151 can be approximately 0.5 to 12.5 millimeters over one or more regions 1052. In one embodiment, height 1151 is approximately 1.5 to 2.5 millimeters.

Figure 12:
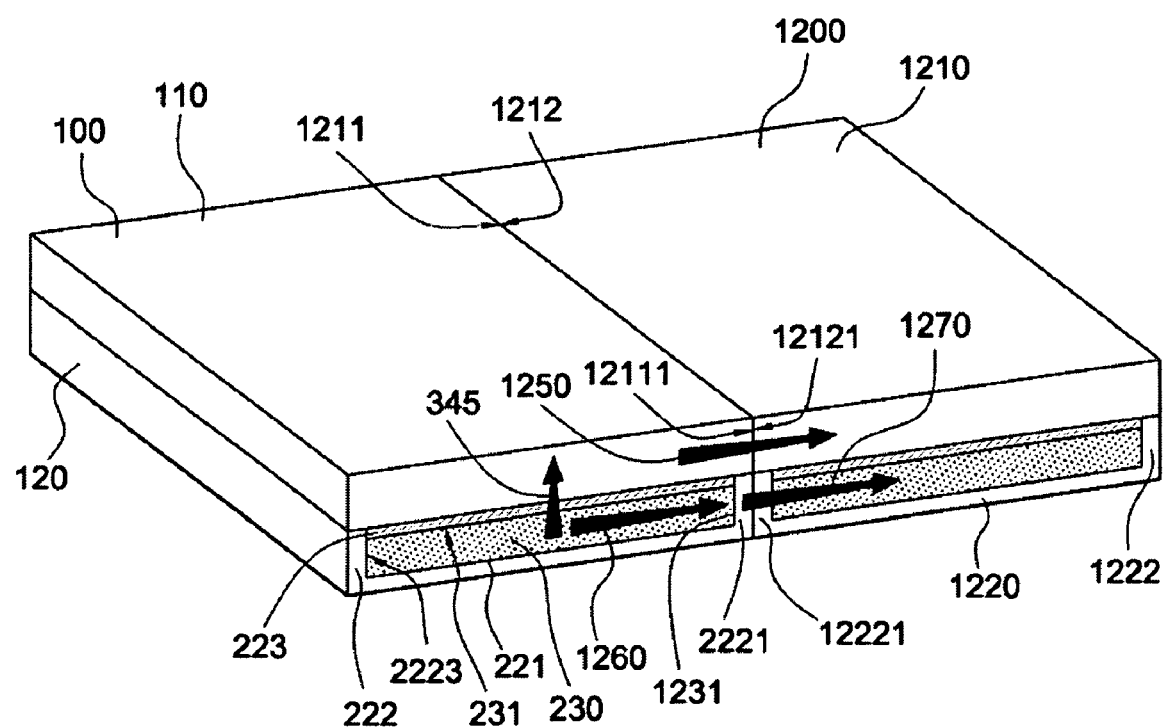
FIG. 12 illustrates a perspective cross-sectional view of the lighted tile system of FIG. 1, with the first tile and a second tile coupled together.

Continuing with the figures, FIG. 12 illustrates a perspective cross-sectional view of lighted tile system 1 with tiles 100 and 1200 coupled together. Tile 1200 is similar to tile 100 in the present example, and is configured to be located contiguous to tile 100 as part of lighted tile system 1. Accordingly, tile 1200 includes ceiling 1210 and tray 1220, and tray 1220 comprises walls 12221 and 12222. Also, ceiling 1210 comprises one or more translucent edges 1212, including translucent edge 12121.

In the present example, ceiling 110 of tile 100 comprises one or more translucent edges 1211 comprising respective border ends of ceiling 110. Ceiling 110 is configured to permit trans-edge light component 1250 to shine past at least translucent edge 12111 of one or more translucent edges 1211. Trans-edge light component 1250 can be a part of light from one or more light sources within tile 100. For example, in the present embodiment, and as explained above in FIG. 3 with respect to light sources 240 of tile 100, portion 345 of light 245 shines towards ceiling 110 and also can be distributed at least in part towards and past translucent edge 12111 as trans-light edge component 1250. In a different example, trans-light edge component 1250 may be a part of other types of light sources within tile 100, such as light sources distributed across surface 231 of substrate 230.

As seen in FIG. 12, when tile 100 and tile 1200 are contiguous with each other, at least a portion of trans-edge light 1250 shines from translucent edge 12111 of tile 100 into tile 1200 through translucent edge 12121 of ceiling 1210 of tile 1200. In the present example, ceilings 110 and 1210 extend at least approximately 5 to 8 millimeters past the top of one or more walls 222 and 1222, respectively, to permit trans-edge light component 1250 to shine past translucent edge 12111 into translucent edge 12121. In one embodiment, ceilings 110 and 1210 extend approximately 6 to 7 millimeters past the top of one or more walls 222 and 1222, respectively. Light from tile 1200 can also shine into tile 110 in a similar manner. The ability of light to shine from one tile in to another tile across their respective ceilings can be beneficial, for example, to inhibit the formation of a dark juncture between contiguous tiles. As a result, the junction between tiles 100 and 1200 can be deemphasized to promote a more seamless integration and/or even distribution of light throughout lighted tile system 1.

In some embodiments, the ability to distribute light from one tile to another can achieved across their respective trays. Such distribution of light can be in combination with and/or in place of the example described above where light is transferred between tiles across their respective ceilings. For example, tray 120 of tile 100 is translucent in the present embodiment of FIG. 12, where edge 1231 of substrate 230 is adjacent to wall 2221 of tray 120. Substrate 230 is configured to distribute light 245 (FIG. 2) from one or more light sources 240 (FIG. 2) to shine a trans-substrate light component 1260 past edge 1231 of substrate 230 towards wall 2221 of tray 120. Trans-substrate light component 1260 is part of light 245. In turn, because tray 120 is translucent, wall 2221 can be configured to permit trans-wall light component 1270 to shine past wall 2221 of tray 120 to an exterior of tile 100. Trans-wall light component 1270 is at least part of trans-substrate light component 1260. In the present embodiment, because tray 1220 of tile 1200 is also translucent, trans-wall light component 1270 can shine from wall 2221 of tile 100 into tile 1200 through wall 12221 to inhibit the formation of a dark juncture between tiles 100 and 1200. In the present example, to facilitate the transmission from tile 100 to tile 1200 of at least part of trans-wall light component 1270, a combined thickness of walls 2221 and 12221 comprises between approximately 5 to 8 millimeters. In one embodiment, the combined thickness can be approximately 6 to 7 millimeters. Light from tile 1200 can also shine into tile 100 in a similar manner.

Figure 13:
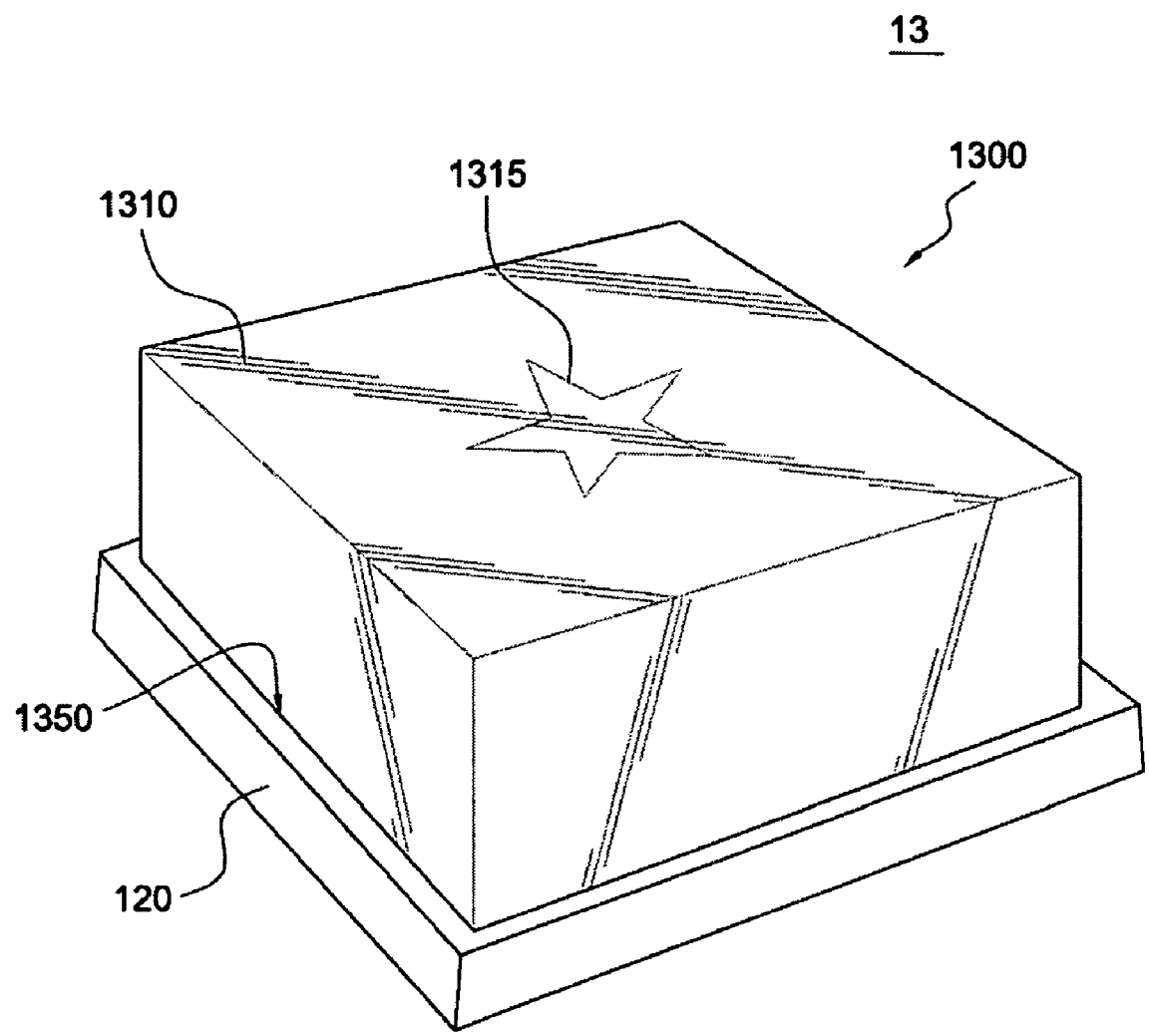
FIG. 13 illustrates a perspective view of a first paver of an illuminated paver system.

Continuing with the figures, FIG. 13 illustrates a perspective view of paver 1300 of illuminated paver system 13. FIG.

14 illustrates a perspective exploded view of paver 1300. Paver 1300 is similar to tile 100 of lighted tile system 1 (FIGS. 1, 2, and 9), but comprises ceiling 1310 (instead of ceiling 110 in FIG. 1) coupled to tray 120. In some examples, an illuminated paver system can be referred to as a lighted tile system.

In the present example, tile 1310 couples directly to tray 120 along junction 1350 within the perimeter of one or more walls 222 of tray 120, and tile 1310 extends into cavity 223 of tray 120 and protrudes upwards past walls 222 to form one or more exterior surfaces of paver 1300. In some embodiments, junction 1350 can comprise a silicone junction, a grout junction, an adhesive junction, and/or a sonic weld junction between tile 1310 and walls 222 of tray 120, such that junction 1350 could restrict water and/or dirt form entering cavity 223 of tray 120. In a different embodiment, tile 1310 could couple atop walls 222 of tray 120, similar to the description and illustration above for ceiling 100 coupled to walls 222 of tray 120 in FIG. 1. Because tile 1310 couples directly to tray 120 in the present example, a cost benefit can be achieved by foregoing the need to supply tile 1300 with a ceiling like ceiling 110 of tile 100.

Tile 1310 is translucent in the present embodiment, and can comprise materials similar to those described above for ceiling 110 (FIGS. 1-2 and 9-12). In the present example, tile 1310 comprises a glass material, and the translucence of tile 1310 permits at least part of light 1445 to shine through tile 1310 to be appreciable from an exterior of paver 1300. In the present embodiment, tile 1310 comprises a decorative tile configured to illuminate or outline pattern 1315 when lit. In some embodiments, pattern 1315 could be more than simply decorative by conveying information, text, and/or graphics. In a different embodiment, tile 1310 could still comprise a decorative tile without comprising pattern 1315.

Paver 1300 further comprises substrate 1430 located between tile 1310 and tray 120, and one or more light sources 1440 coupled to substrate 1430. In a different embodiment, paver 1300 could comprise a substrate similar to one or more of substrates 230 (FIG. 2), 430 (FIG. 4), 530 (FIG. 5), 630 (FIG. 6), or 730 (FIG. 7) and/or light sources similar to light sources 240 (FIGS. 2-8) along an edge of tile 100 (FIG. 2). In the present embodiment, however, one or more light sources 1440 comprise OLEDs located across side 1431 of substrate 1430, and are configured to shine light 1445 substantially perpendicular to side 1431 of substrate 1430 and towards tile 1310. In a different embodiment, light sources 1440 can comprise LECs. Light 1445 is a combination of lights from one or more light sources 1440, and in the present embodiment substrate 1430 is configured to direct light 1445 towards and substantially evenly across tile 1310. In the present embodiment, lights 1440 are coupled to one or more connectors 1423-1424 on a backside of substrate 1430. In some examples, connectors 1423 and/or 1424 may be similar to leads 131-132 (FIGS. 1-2), and could be configured to provide power and/or control signals to light sources 1440. The present example also shows conduits 1321 and 1322, located at floor 221 of tray 120, and through which connectors 1423 and/or 1424 could be accessible through an exterior of paver 1300. In a different embodiment, conduits 1321 and 1322 could be located elsewhere, however, such as similar to the location of conduits 121-122.

The ability to arrange light sources 1440 across substrate 1430 can be beneficial when compared to the edge-lit arrangement of light sources 240 and substrate 230 (FIG. 2), because light shining from substrate 1430 can be better controlled in terms of distribution and/or uniformity. In addition, because the OLEDs of light sources 1440 are integrated into substrate 1430, there is no need to mount light sources onto a carrier like carrier 241 (FIG. 2), or to align light sources with respect to an edge like edge 232 of substrate 230 (FIGS. 2-3). The use of light sources 1440 also eliminates the need for hot spot blocking mechanism 270 (FIG. 2). Other embodiments could comprise other types of light sources, like LEDs, similarly located across side 1431 of substrate 1430.

Tile 1310 and light sources 1440 of paver 1300 can comprise materials and structures that can be cropped as described above for tile 100. In the present embodiment, tile 1300 comprises glass, which in some embodiments is not crop-able. Nevertheless, tray 120, substrate 1430, and light sources 1440 are still crop-able and re-sealable as described above for tile 1 with respect to tray 120, substrate 230, and light sources 240. (FIG. 9).

Figure 14:
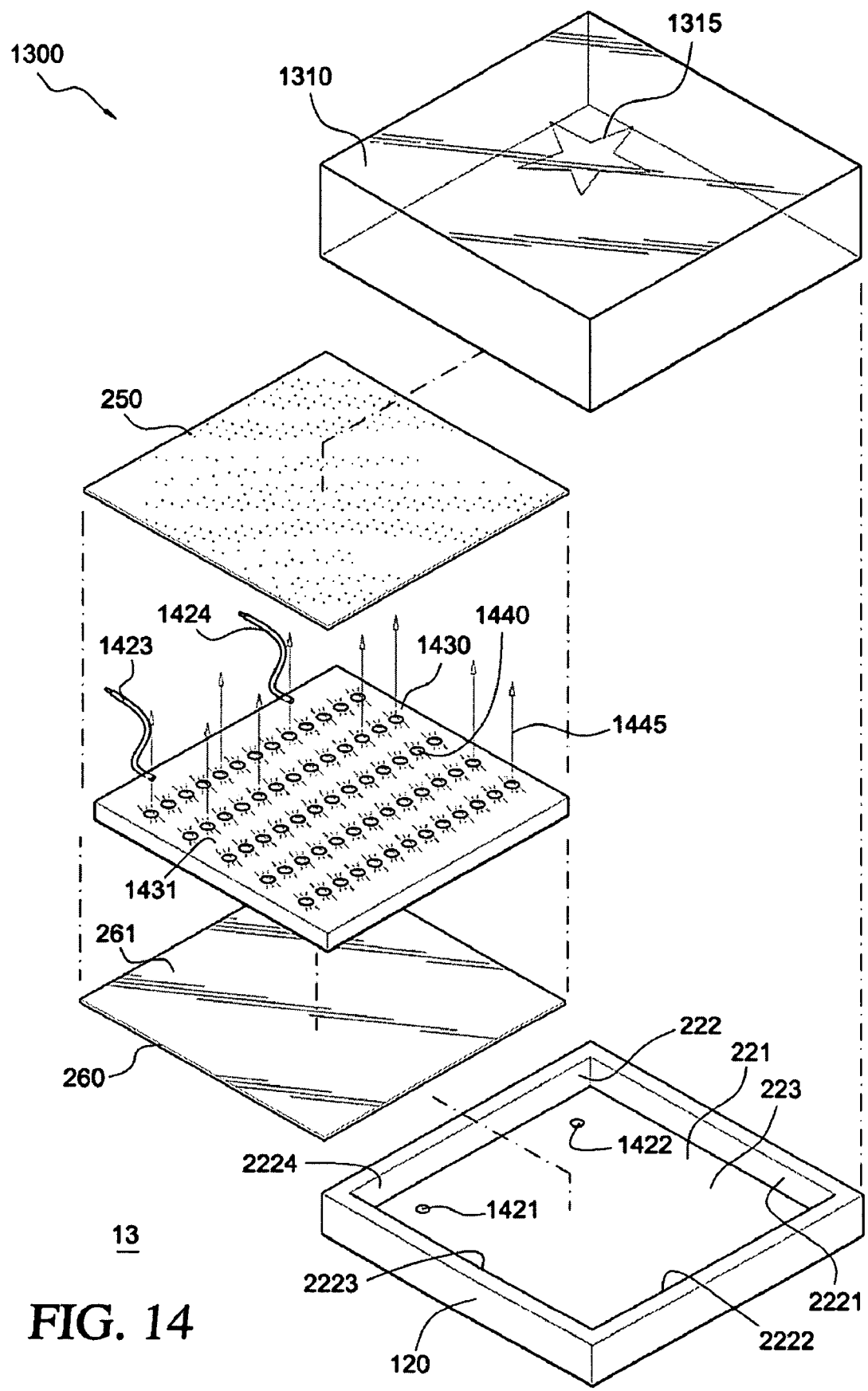
FIG. 14 illustrates a perspective exploded view of the first paver of FIG. 13.
Figure 15:
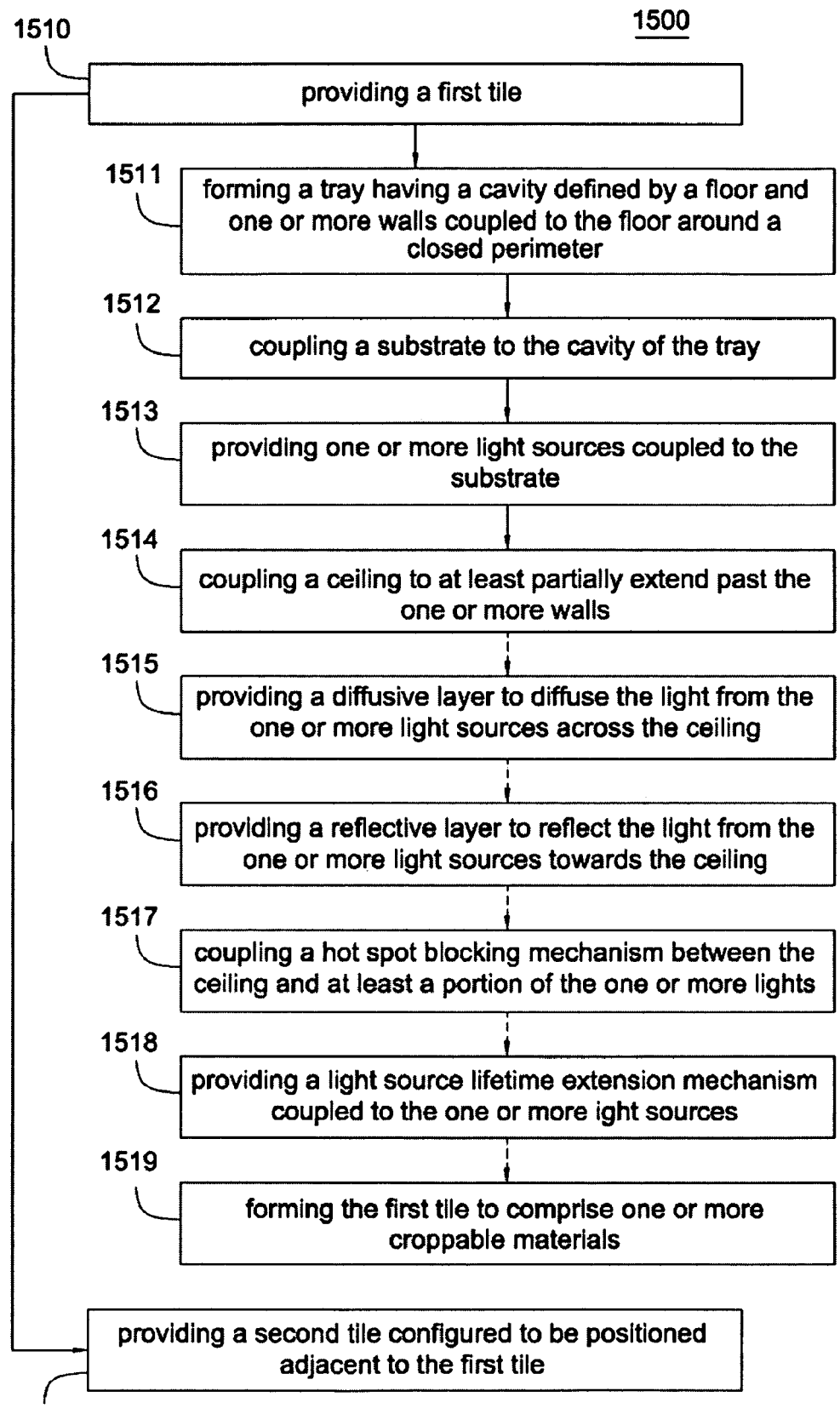
FIG. 15 illustrates a flowchart of a method for manufacturing a lighted tile system.

Moving along, FIG. 15 illustrates a flowchart of method 1500 for manufacturing a lighted tile system. In one example, the lighted tile system of method 1500 can be similar to lighted tile system 1 (FIGS. 1, 2, 9, and 12), lighted tile system 10 (FIGS. 10-11), and/or to illuminated paver system 13 (FIGS. 13-14), as described above.

Block 1510 of method 1500 comprises providing a first tile, where the first tile of block 1510 can be similar to tile 100 (FIGS. 1, 2, 9, and 12), tile 1000 (FIGS. 10-11), tile 1200 (FIG. 12), and/or paver 1300 (FIGS. 13-14). Providing the first tile of method 1500 can comprise several subparts, as detailed below.

Block 1511 of method 1500 is a subpart to block 1510, and comprises forming a tray having a cavity defined by a floor and by one or more walls coupled to a perimeter of the floor. In some examples, the tray of block 1511 can be similar to tray 120 (FIGS. 1-2, and 9-14), such that the floor and the one or more walls of block 1511 can be similar to floor 221 (FIGS. 2, 12, and 14) and walls 222 (FIGS. 2, 12, and 14) of tray 120. Similarly, the cavity of block 1511 can be similar to cavity 223 (FIGS. 2, 9, 12, and 14) of tray 120.

Block 1512 of method 1500 is another subpart of block 1510, and comprises coupling a substrate to the cavity of the tray. The substrate of block 1512 can be similar to substrates 230 (FIGS. 2-3, 9, and 12), 430 (FIG. 4), 530 (FIG. 5), 630 (FIG. 6), or 730 (FIG. 7) in some examples, or to substrate 1430 (FIG. 14) in other examples. The substrate of block 1512 can be sized to fit within the cavity of the tray of block 1511.

Block 1513 of method 1500 is a subpart of block 1510, and comprises providing one or more light sources coupled to the substrate. In some examples, the one or more light sources can be similar to light sources 240 (FIGS. 2-8), or to light sources 1440 (FIG. 14), and can comprise one or more LEDs, OLEDs, and/or LECs, and/or can be coupled to the substrate of block 1512 as described in FIG. 2 and/or FIG. 14 to shine a light from the one or more light sources in an evenly or uniformly distributed pattern away from the substrate. The evenly or uniformly distributed pattern can be configured in some examples to restrict the appearance of hot sports or dead zones of light as seen from the exterior of the first tile, without taking into account any patterns in the ceiling or tile located over the substrate.

Providing the one or more light sources coupled to the substrate in block 1513 can include purchasing the substrate that already has the light sources coupled to it. In this embodiment, block 1513 can occur before blocks 1512 and/or 1511.

Block 1514 of method 1500 is a subpart of block 1510, and comprises coupling a ceiling to at least partially extend past the one or more walls of block 1511. The ceiling of block 1514 can be similar to ceiling 110 (FIGS. 1, 2, 9, and 12), ceiling 1010 (FIGS. 10-11), and/or tile 1310 (FIG. 13-14). The ceiling is at least partially translucent and configured to permit at least part of the light from the one or more light sources of block 1513 to shine through the ceiling to be visible at an exterior of the first tile of block 1510. The ceiling of block 1514 can be coupled to the walls of block 1511, as described above for the coupling of ceiling 110 and/or tile 1310 to walls 222 of tray 120, by forming a junction between the ceiling and the walls. The junction can be configured in some examples to restrict water and/or dirt from entering the cavity of the tray of block 1511, and can comprise a silicone junction, a grout junction, an adhesive junction, and/or a sonic weld junction.

In some examples, the one or more light sources of block 1513 can be positioned substantially parallel to a first edge of the substrate of block 1512 to shine light through the first edge and into the substrate, as described above for FIGS. 2-3. In another embodiment, the one or more light sources of block 1513 can be arranged across a first side of the substrate of block 1512 to shine light substantially perpendicular to the first side of the substrate and towards the ceiling.

The ceiling of block 1514 can also comprise, in some examples, an exterior side with a grid, where the grid has one or more ribs with one or more regions between the one or more ribs. In the same or a different example, the one or more regions of the grid can be sized to accommodate one or more translucent overlays between the one or more ribs, as described above for translucent tiles 1110 over grid 1050 of ceiling 1010 in FIGS. 10-11.

Providing the first tile of block 1510 can also optionally comprise providing a diffusive layer to diffuse the light from the one or more light sources of block 1513 across the ceiling of block 1514, as described in block 1515 of method 1500. In some examples, the diffusive layer can be similar to diffusive layer 250 (FIGS. 2 and 14).

Block 1510 of method 1500 can further comprise, in some examples, a block 1516 for providing a reflective layer to reflect the light from the one or more light sources towards the ceiling. The reflective layer can comprise a reflective sheet located between the floor of block 1511 and the substrate of block 1512, such as reflective sheet 261 of FIGS. 2 and 14. In other examples, the reflective layer of block 1516 can instead comprise a surface of the floor of block 1511 facing the substrate of block 1512.

Moving along, block 1517 of method 1500 optionally comprises, as a subpart of block 1510, coupling a hot spot blocking mechanism between the ceiling and at least a portion of the one or more lights. In some examples, the hot spot blocking mechanism can be similar to hot spot blocking mechanism 270 (FIG. 2).

Block 1518 of method 1500 is another optional subpart of block 1510, and comprises providing a light source lifetime extension mechanism coupled to the one or more light sources of block 1513. The light source lifetime extension mechanism can be configured to derate or decrease power delivered to the light sources of block 1513, and can be similar in some embodiments to derating circuit 850 as described for FIG. 8.

Block 1519 of method 1500 can also optionally comprise forming the first tile of block 1510 to comprise crop-able materials. In some examples, the first tile can be formed with crop-able materials as described for tiles 100 and 1300. The crop-able materials can permit the cropping of the first tile to form a custom first tile portion, as described above, for example, for FIG. 9. The light sources of block 1513 can be configured to remain operable after the cropping of block 1519, as described above with respect to FIGS. 8-9 and 13-14. In some examples, the cavity of the tray of block 1511 can be sealed for waterproofing after the cropping described for block 1519. The cavity can be sealed using, for example, a silicone seal, a grout seal, an adhesive seal, and/or a replacement wall section as described above for FIG. 9.

When part of method 1500, blocks 1515-1518 can be performed before one or more of blocks 1511-1514, and the sequence of blocks 1515-1518 can also vary. Furthermore, when part of method 1500, block 1519 can be performed inherently by one or more of blocks 1511-1918.

Continuing with method 1500, block 1520 comprises providing a second tile configured to be positioned adjacent to the first tile of block 1510, where the second tile can be similar to the first tile of block 1510. In some examples, the first and second tiles of method 1500 can be configured to permit light to pass between each other. For example, the first tile border can be configured to permit at least a part of the light from the one or more light sources of block 1513 to shine past the first tile border into the second tile via the second tile border. This arrangement can be used to inhibit formation of a dark juncture between the first and second tiles when positioned adjacent to each other. In some embodiments, the part of the light from the one or more light sources shines past the first tile border via a first edge of the ceiling of the first tile, as described above in FIG. 12 for trans-edge light component 1250 passing between translucent edges 12111 and 12121. In the same or a different embodiment, the part of the light from the one or more light sources shines past the first tile border via a first wall of the one or more walls of the tray of the first tile, as described above in FIG. 12 for trans-substrate light component 1260 and/or trans-wall light component 1270 through walls 2221 and 12221.

In some examples, one or more of the different blocks of method 1500 can be combined into a single step. For example, as described above, blocks 1511 and 1516 can be combined into a single block in cases where the reflective layer of block 1516 comprises a substrate of the floor of the tray of block 1511. In the same or a different example, the sequence of one or more of the different blocks of method 1500 can be changed. As an example, optional blocks 1515-1518 can be performed before coupling the ceiling in block 11514 to the walls of the tray of block 1511. As another example, block 1517 could be performed before or after block 1515. In the same or a different example, method 1500 can comprise further or different steps, such as coupling a third tile to the first tile of block 1510 and/or to the second tile of block 1520.

Although the illuminated tile systems and methods for manufacturing the same have been described with reference to specific embodiments, various changes may be made without departing from the spirit or scope of the disclosure herein. Various examples of such changes have been given in the foregoing description. As another example, although the different tile and paver systems described herein have been shown as substantially square or rectangular, there may be embodiments with tiles or pavers comprising other geometric shapes, such as triangles, pentagons, or hexagons. As a further example, a tile of a lighted tile system may be provided without a ceiling, allowing another party to affix a desired ceiling during installation of the tile. Similarly, a paver of an illuminated paver system may be provided without a tile coupled to the walls of the tray, allowing another party to affix a desired tile during installation of the paver. These and other modifications would not interfere with or depart from the concepts described herein.

Accordingly, the disclosure of embodiments of the illuminated tile systems and methods for manufacturing the same is intended to be illustrative of the scope of the application and is not intended to be limiting. It is intended that the scope of this application shall be limited only to the extent required by the appended claims. For example, it will be readily apparent that the illuminated tile systems and methods for manufacturing the same discussed herein may be implemented in a variety of embodiments, and that the foregoing discussion of certain of these embodiments does not necessarily represent a complete description of all possible embodiments. As a specific example, although FIGS. 1-2 show ceiling 110 of tile 100 as devoid of any graphics, there may be examples where ceiling 110 and/or diffusive layer 250 could comprise graphics similar to pattern 1315 of FIGS. 13-14. Therefore, the detailed description of the drawings, and the drawings themselves, disclose at least one preferred embodiment of the illuminated tile systems and methods for manufacturing the same, and may disclose alternative embodiments of the illuminated tile systems and methods for manufacturing the same.

All elements claimed in any particular claim are essential to the lighted tile system and/or illuminated paver system claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A lighted tile system, comprising:
   a first tile comprising:
   a tray comprising:
     a floor;
     one or more walls coupled to a perimeter of the floor; and
     a cavity defined at least in part by the floor and the one or more walls;
   a ceiling coupled to the tray and located substantially opposite the floor of the tray;
   a sealing junction to substantially seal the floor and the ceiling together to make the lighted tile system at least one of weatherproof and waterproof;
   a substrate located between the floor of the tray and the ceiling;
   one or more light sources coupled to the substrate to shine a light from the one or more light sources in a substantially uniform pattern towards the ceiling; and
   a hot spot blocking mechanism located between a ceiling and at least a portion of one or more light sources;
   wherein the ceiling is at least partially translucent to permit at least part of the light from the one or more light sources to shine through the ceiling.

2. The lighted tile system of claim 1 where the junction is sealed by a sealant that comprises at least one of: silicone, adhesive, sonic weld and grout.

3. The lighted tile system of claim 1, wherein the first tile further comprises:
   a diffusive layer located between the substrate and the ceiling;
   wherein the diffusive layer is configured to diffuse the light from the one or more light sources across at least a portion of the ceiling.

4. The lighted tile system of claim 1, wherein the first tile further comprises:
   a reflective layer configured to reflect the light from the one or more light sources towards the ceiling;
   wherein the reflective layer comprises at least one of:
   a reflective sheet located between the floor of the tray and a second side of the substrate; and
   a surface of the floor facing the substrate.

5. The lighted tile system of claim 1, wherein: at least one of the ceiling and the tray comprise at least one of:
   a glass material;
   a crystalline stone material;
   a metallic material; and
   a plastic material.

6. The lighted tile system of claim 1, wherein:
   the ceiling comprises one or more translucent edges configured to permit at least a trans-edge light component of the light from the one or more light sources to shine past at least a first translucent edge of the one or more translucent edges.

7. The lighted tile system of claim 6, further comprising: a second tile configured to be located contiguous with the first tile;
   wherein, when the first tile and the second tile are located contiguous with each other, at least a portion of the trans-edge light component shines into the second tile through a translucent edge of a ceiling of the second tile.

8. The lighted tile system of claim 1, wherein:
   the ceiling is configured to extend at least approximately 5 to 8 millimeters past a top of the one or more walls.

9. The lighted tile system of claim 1, wherein:
   an edge of the substrate is adjacent to a first wall of the one or more walls of the tray;
   the light from the one or more light sources comprises a trans-substrate light component;
   the substrate is configured to distribute the light of the one or more light sources to shine the trans-substrate light component past the edge of the substrate and towards the first wall;
   the trans-substrate light component comprises a trans-wall light component;
   the first wall is translucent and configured to permit the trans-wall light component to shine past the first wall.

10. The lighted tile system of claim 9, further comprising: a second tile configured to be located contiguous with the first tile;
    wherein, when the first tile and the second tile are located contiguous with each other, the trans-wall light component shines into the second tile through a translucent wall of a tray of the second tile.

11. The lighted tile system of claim 10, wherein:
    the first wall of the tray of the first tile and the translucent wall of the tray of the second tile comprise a combined thickness of approximately 5 to 8 millimeters.

12. The lighted tile system of claim 1, wherein:
    the one or more light sources comprise at least one of:
    a light emitting diode;
    an organic light emitting diode; and
    a light emitting capacitor.

13. The lighted tile system of claim 1, further comprising: a power supply circuit coupled to at least a portion of the one or more light sources.

14. The lighted tile system of claim 1, further comprising:

a derating circuit configured to deliver a derated power magnitude to the one or more light sources;
wherein:
the one or more light sources are rated to handle a rated power magnitude; and the derated power magnitude is less than the rated power magnitude.

15. The lighted tile system of claim 14, wherein:
the derating circuit comprises one or more resistance elements to generate the derated power magnitude; and
each one of the one or more light sources is coupled to a different one of the one or more resistance elements of the power supply circuit.

16. The lighted tile system of claim 1, wherein:
the first tile is comprised of materials crop-able to form a custom edge of a remaining first tile section; and
when the first tile is cropped, the one or more light sources coupled to the remaining first tile section remain operable.

17. The lighted tile system of claim 16, wherein: the custom edge is sealable with a seal comprising at least one of:
a silicone seal;
a grout seal;
an adhesive seal; and
a replacement wall section, wherein
the seal is configured to be waterproof to restrict water from entering the cavity of the tray.

18. The lighted tile system of claim 1, wherein:
the one or more light sources are located parallel to a first edge of the substrate and configured to shine the light through the first edge into the substrate.

19. The lighted tile system of claim 1, wherein:
the one or more light sources are located across a first side of the substrate and configured to shine the light substantially perpendicular to the first side of the substrate and towards the ceiling.

20. The lighted tile system of claim 1, wherein: the first tile comprises a junction between at least two of:
the one or more walls of the tray;
the floor of the tray; and
the ceiling, wherein
the junction comprises at least one of:
a silicone junction;
a grout junction;
an adhesive junction; and
a sonic weld junction, wherein
the junction is configured to restrict water from entering the cavity of the tray.

21. The lighted tile system of claim 1, wherein:
the one or more light sources are integral with the substrate.

22. The lighted tile system of claim 1, wherein:
the ceiling comprises a grid at an exterior side of the ceiling;
the grid comprises one or more ribs with one or more regions between the one or more ribs; and
the one or more regions are sized to accommodate one or more translucent overlays between the one or more ribs.

23. The lighted tile system of claim 22, wherein: the ribs protrude approximately 0.5 to 12.5 millimeters above to the pads.

24. The lighted tile system of claim 22, wherein:
the grid is configured to accommodate a grout material above the one or more ribs and between the one or more translucent overlays.

25. An illuminated paver system, comprising:
a first paver comprising:
a tray comprising:
a floor; and
one or more walls coupled around a perimeter of the floor;
a tile coupled to the one or more walls of the tray;
a substrate located between the tile and the tray;
one or more light sources coupled to the substrate; and
a hot spot blocking mechanism positioned between the tile and at least a portion of the one or more lights;
wherein:
the tile protrudes at least partially past the one or more walls of the tray;
the substrate is configured to direct a light from the one or more light sources towards and substantially evenly across the tile;
the tile is at least partially translucent to permit at least part of the light from the one or more light sources to shine through the tile;
at least one of the tile or the tray comprises at least one of:
a glass material;
a metallic material;
a crystalline stone material; and
a plastic material;
the one or more light sources comprise at least one of:
a light emitting diode;
an organic light emitting diode; and
a light emitting capacitor;
the first paver comprises a junction between at least two of:
the one or more walls of the tray;
the floor of the tray; and
the tile;
the junction of the tile comprises at least one of:
a silicone junction;
a grout junction;
an adhesive junction; and
a sonic weld junction; and
the junction of the tile is configured to restrict water and dirt from entering the tray.

26. The illuminated paver system of claim 25, further comprising:
one or more resistive elements coupled to the one or more light sources; wherein:
different ones of the one or more resistive elements are coupled to different ones of the one or more light sources; and
the one or more resistive elements are configured to decrease a voltage across each of the one or more light sources.

27. The illuminated paver system of claim 25, wherein:
at least the tray and the substrate of the first paver are crop-able to form a cropped edge of a remaining first paver portion after a cropping of the first paver;
the one or more light sources coupled to the remaining first paver portion remain operable after the cropping;
the cropped edge is sealable with a seal comprising at least one of: a silicone seal;
a grout seal;
an adhesive seal; and
a replacement wall section, wherein
the seal is waterproof to restrict water from entering the cavity of the tray.

28. The illuminated paver system of claim 25, wherein:
the one or more light sources are positioned parallel to a first edge of the substrate and configured to shine the light through the first edge into the substrate.

29. The illuminated paver system of claim 25, wherein:
the one or more light sources are arranged across a first side of the substrate and configured to shine the light substantially perpendicular to the first side of the substrate towards the tile.

30. A method for manufacturing a lighted tile system, the method comprising:
providing a first tile;
wherein:
providing the first tile comprises:
providing a tray having a cavity defined by a floor and by one or more walls coupled to a perimeter of the floor;
coupling a substrate to the cavity of the tray;
providing one or more light sources coupled to the substrate; and coupling a ceiling to at least partially extend past the one or more walls;
a sealing junction to substantially seal the floor and the ceiling together; and
make the lighted tile system at least one of weatherproof and waterproof;
providing the one or more light sources coupled to the substrate comprises providing the one or more light sources to shine a light from the one or more light sources in a substantially evenly distributed pattern towards the ceiling;
coupling a hot spot blocking mechanism between the ceiling and at least a portion of the one or more lights; and
the ceiling is at least partially translucent and configured to permit at least a first part of the light from the one or more light sources to shine through the ceiling.

31. The method of claim 30, wherein providing the first tile further comprises at least one of:
providing a diffusive layer located between the substrate and the ceiling and configured to diffuse the light from the one or more light sources across the ceiling; and
providing a reflective layer configured to reflect the light from the one or more light sources towards the ceiling, the reflective layer comprising at least one of:
a reflective sheet located between the floor of the tray and the substrate; or a surface of the floor facing the substrate.

32. The method of claim 30, wherein:
at least one of the ceiling or the tray comprises at least one of:
a glass material;
a metallic material;
a crystalline stone material; and
a plastic material; and
the one or more light sources comprise at least one of:
a light emitting diode;
a organic light emitting diode; and
a light emitting capacitor.

33. The method of claim 30, further comprising:
providing a second tile configured to be positioned contiguous with the first tile; wherein:
a first tile border of the first tile and a second tile border of the second tile are configured to inhibit formation of a dark juncture between the first and second tiles when positioned contiguous with each other;
the first tile border is configured to permit at least a second part of the light from the one or more light sources to shine past the first tile border into the second tile via the second tile border; and
the second part of the light from the one or more light sources shines past the first tile border via at least one of:
a first edge of the ceiling of the first tile; and
a first wall of the one or more walls of the tray of the first tile.

34. The method of claim 30, wherein providing the first tile further comprises: forming the first tile to comprise one or more crop-able materials;
wherein, after a cropping of the crop-able materials to form a custom first tile portion, the one or more light sources coupled to the custom first tile portion remain operable.

35. The method of claim 34, wherein after the cropping of the crop-able materials, the cavity of the tray of the custom first tile portion is sealable to be waterproof through at least one of a silicone seal, a grout seal, an adhesive seal, and a replacement wall section.

36. The method of claim 30, wherein providing the one or more light sources coupled to the substrate comprises:
positioning the one or more light sources substantially parallel to a first edge of the substrate to shine the light through the first edge into the substrate.

37. The method of claim 30, wherein providing the one or more light sources coupled to the substrate comprises:
providing the one or more light sources across a first side of the substrate to shine the light from the one or more light sources substantially perpendicular to the first side of the substrate and towards the ceiling.

38. The method of claim 30, wherein coupling the ceiling to at least partially extend past the one or more walls comprises:
forming a junction between the ceiling and the one or more walls;
wherein the junction is configured to restrict water from entering the cavity of the tray and comprises at least one of a silicone junction, a grout junction, an adhesive junction, and a sonic weld junction.

39. The method of claim 30, wherein providing the first tile further comprises:
providing an exterior side of the ceiling to comprise a grid having one or more ribs with one or more regions between the one or more ribs; and
the one or more regions are sized to accommodate one or more translucent overlays between the one or more ribs.

40. A method for manufacturing a lighted tile system, the method comprising:
providing a first tile;
wherein:
providing the first tile comprises:
providing a tray having a cavity defined by a floor and by one or more walls coupled to a perimeter of the floor;
coupling a substrate to the cavity of the tray;
providing one or more light sources coupled to the substrate; and coupling a ceiling to at least partially extend past the one or more walls;
a sealing junction to substantially seal the floor and the ceiling together; and
make the lighted tile system at least one of weatherproof and waterproof;
providing the one or more light sources coupled to the substrate comprises providing the one or more light sources to shine a light from the one or more light sources in a substantially evenly distributed pattern towards the ceiling;
providing a light source lifetime extension mechanism coupled to the one or more light sources and configured to derate a power delivered to the one of more light sources; and
the ceiling is at least partially translucent and configured to permit at least a first part of the light from the one or more light sources to shine through the ceiling.

41. The method of claim 30, wherein the lighted tile system is waterproof.

42. The method of claim 30, wherein the lighted tile system is weatherproof.

43. The method of claim 30, wherein providing the first tile further comprises at least one of:
providing a diffusive layer located between the substrate and the ceiling and configured to diffuse the light from the one or more light sources across the ceiling; and
providing a reflective layer configured to reflect the light from the one or more light sources towards the ceiling, the reflective layer comprising at least one of:
a reflective sheet located between the floor of the tray and the substrate; or a surface of the floor facing the substrate.

44. The method of claim 40, wherein:
at least one of the ceiling or the tray comprises at least one of:
a glass material;
a metallic material;
a crystalline stone material; and
a plastic material; and
the one or more light sources comprise at least one of:
a light emitting diode;
a organic light emitting diode; and
a light emitting capacitor.

45. The method of claim 40, further comprising:
providing a second tile configured to be positioned contiguous with the first tile; wherein:
a first tile border of the first tile and a second tile border of the second tile are configured to inhibit formation of a dark juncture between the first and second tiles when positioned contiguous with each other;
the first tile border is configured to permit at least a second part of the light from the one or more light sources to shine past the first tile border into the second tile via the second tile border; and
the second part of the light from the one or more light sources shines past the first tile border via at least one of:
a first edge of the ceiling of the first tile; and
a first wall of the one or more walls of the tray of the first tile.

46. The method of claim 40, wherein providing the first tile further comprises:
forming the first tile to comprise one or more crop-able materials;
wherein, after a cropping of the crop-able materials to form a custom first tile portion, the one or more light sources coupled to the custom first tile portion remain operable.

47. The method of claim 40, wherein providing the one or more light sources coupled to the substrate comprises:
positioning the one or more light sources substantially parallel to a first edge of the substrate to shine the light through the first edge into the substrate.

48. The method of claim 40, wherein providing the one or more light sources coupled to the substrate comprises:
providing the one or more light sources across a first side of the substrate to shine the light from the one or more light sources substantially perpendicular to the first side of the substrate and towards the ceiling.

49. The method of claim 40, wherein coupling the ceiling to at least partially extend past the one or more walls comprises:
forming a junction between the ceiling and the one or more walls;
wherein the junction is configured to restrict water from entering the cavity of the tray and comprises at least one of a silicone junction, a grout junction, an adhesive junction, and a sonic weld junction.

50. The method of claim 40, wherein providing the first tile further comprises:
providing an exterior side of the ceiling to comprise a grid having one or more ribs with one or more regions between the one or more ribs; and
the one or more regions are sized to accommodate one or more translucent overlays between the one or more ribs.

* * * * *

UNITED STATES PATENT AND TRADEMARK OFFICE
CERTIFICATE OF CORRECTION

| | | |
|---|---|---|
| PATENT NO. | : 8,092,034 B2 | Page 1 of 1 |
| APPLICATION NO. | : 12/266423 | |
| DATED | : January 10, 2012 | |
| INVENTOR(S) | : Ashoff et al. | |

It is certified that error appears in the above-identified patent and that said Letters Patent is hereby corrected as shown below:

Title Page

Item (12) should read
United States Patent
Ashoff et al.

Item (75) should read
First name inventor:
    Richard davis Ashoff

Item (73) should read
Assignee:
    Richard davis Ashoff

Signed and Sealed this
Fourteenth Day of February, 2012

David J. Kappos
*Director of the United States Patent and Trademark Office*